United States Patent [19]

Inoue et al.

[11] Patent Number: 4,522,555
[45] Date of Patent: Jun. 11, 1985

[54] HANDLING APPARATUS

[75] Inventors: Toshitsugu Inoue, Kyoto; Akiyoshi Nakada, Suita; Haruo Kaji, Kadoma; Makoto Doi, Sakai; Kuninori Takezawa, Ikeda, all of Japan

[73] Assignee: Matsushita Electric Industrial Co., Ltd., Kadoma, Japan

[21] Appl. No.: 420,571

[22] Filed: Sep. 20, 1982

[30] Foreign Application Priority Data

Sep. 25, 1981 [JP] Japan ............... 56-152779

[51] Int. Cl.³ .............................................. B25J 9/00
[52] U.S. Cl. ................................... 414/733; 414/917; 901/14; 74/469; 74/479
[58] Field of Search ............... 414/733, 917, 735, 738, 414/728; 269/71, 45; 248/281.1; 74/469, 479; 198/486; 901/14, 15

[56] References Cited

U.S. PATENT DOCUMENTS 4,213,591  7/1980  Jaakkola ............... 248/281.1
4,234,150  11/1980  Mee et al. ............... 248/281.1
4,341,502  7/1982  Makino ............... 414/917 X

FOREIGN PATENT DOCUMENTS 55-90287  7/1980  Japan .
676440    7/1979  U.S.S.R. ............... 414/917

Primary Examiner—Terrance L. Siemens
Attorney, Agent, or Firm—Cushman, Darby & Cushman

[57] ABSTRACT

Upper parallelogram links (8, 8, 5, 12) and lower parallelogram links (14, 14, 12, 17) are series connected at an intermediate driving unit 12 with direction of the journal shafts (7, 7, 10, 10) of the upper parallelogram links and direction of the journal shafts (13, 13, 16, 16) of the lower parallelogram links being perpendicular to each other; thereby a third driving unit 17, to which a shaft of a hand 19 is mounted, is always kept in parallel to a first driving unit 5 irrespective of the position of the hand 19; thus a reliable handling by hand is assured, and also accurate horizontal motions are attainable with conventional computing means.

4 Claims, 3 Drawing Figures

HANDLING APPARATUS

BACKGROUND OF THE INVENTION

1. Field of the Technology

The present invention relates to a handling apparatus having freedom of motion like a human hand by using link mechanisms.

2. Description of the Prior Art

Hitherto several configurations have been proposed for handling apparatus having freedom of motion like a human hand. The use of pivoted or fulcrumed link mechanisms has the advantage of ease of control of the angular position of a hand, and accordingly, such mechanisms have been widely used in recent years. Japanese published unexamined patent No. Sho 55-90287 shows such an example. Such conventional handling apparatus has the shortcomings that is moving range is small and its mechanism is too large.

SUMMARY OF THE INVENTION

The present invention provides handling apparatus which is simple in mechanical construction, easy to control and has a large moving range.

DESCRIPTION OF THE PREFERRED EMBODIMENT

A handling apparatus in accordance with the present invention comprises a first parallelogram link mechanism, a second parallelogram link mechanism which is connected in series to the first parallelogram link mechanism and to holding means, moving directions of both parallelogram to link mechanisms being at substantially a right angle to each other, and control means for controlling the first parallelogram link mechanism and the second parallelogram link mechanism independently of each other.

Figure 1:
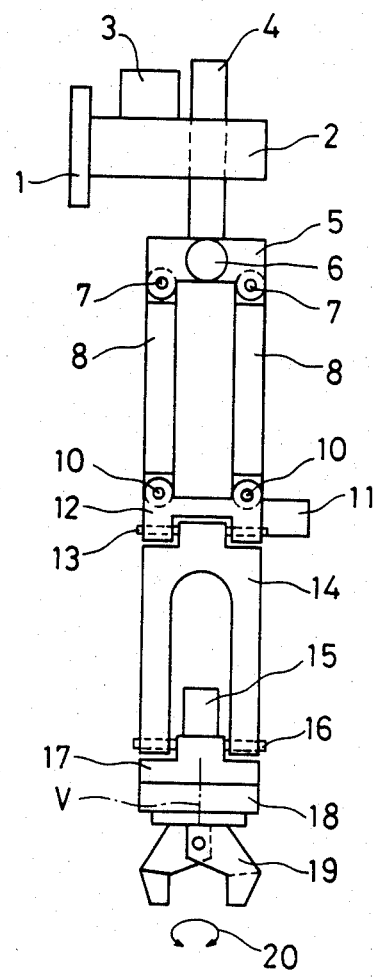
FIG. 1 is an elevational side view of a handling apparatus embodying the present invention.
Figure 2:
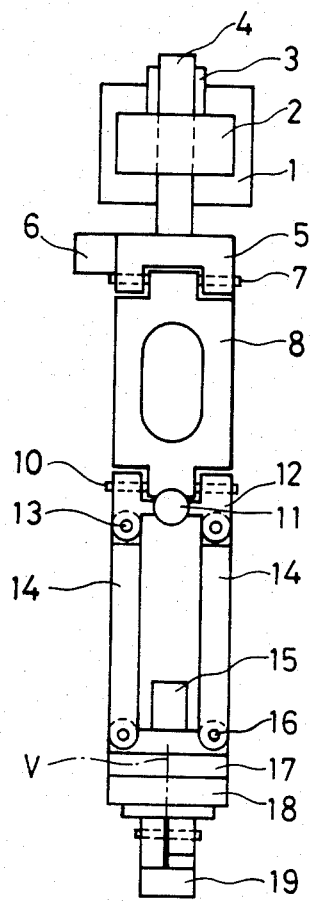
FIG. 2 is an elevational front view of the apparatus of FIG. 1.
Figure 3:
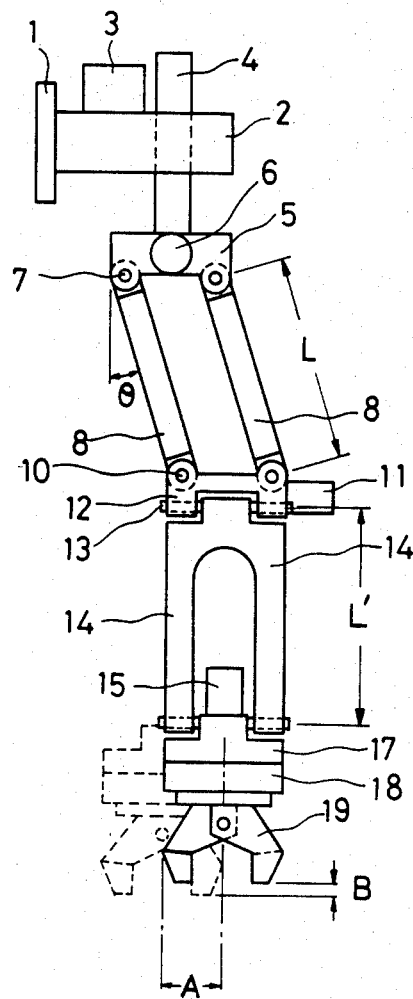
FIG. 3 is an elevational side view of the apparatus at an operating position.

A preferred example is shown in FIG. 1, FIG. 2 and FIG. 3.

A vertical drive unit 2 having a drive motor 3 and a vertically movable rod 4 is fixed to a base 1 which is to be mounted on a large frame or a wall (not shown). The rod 4 is vertically driven by means of the drive motor 3 through a known mechanism, such as pinion and rack, worm gear and rack, wire and pulley, etc.

A first drive unit 5 is fixed to the bottom end of the vertical rod 4 and has two parallel links 8, 8 of substantially the same length, which are journaled by parallel pins 7, 7. The first drive unit 5 further has a motor 6 for angularly moving the links 8, 8 about the pins 7, 7 by means of known mechanism, such as gears, etc.

The lower ends of the parallel links 8, 8 are journaled or fulcrumed on a second drive unit 12 by parallel pins 10, 10. The spacing between and the directions of the parallel pins 7,7 are substantially the same, as those of the pins 10, 10. The four pins 7, 7 and 10, 10 are disposed substantially parallel and horizontal, so that the second drive unit 12 is always parallel to the first drive unit 5 (i.e., both horizontal), even when the former is moved rightwards or leftwards as respects FIG. 1 (i.e. frontwards or backwards as respects FIG. 2). The second drive unit 12 has a pair of parallel links 14, 14, which are of substantially the same length and are journaled by horizontal parallel pins 13, 13. These pins 13, 13 are disposed at right angles to the pins 7, 7 and 10, 10. The second drive unit 12 further has a motor 11 for angularly moving the links 14, 14 by means of known mechanism, such as gears, etc.

The lower ends of the parallel links 14, 14 are journaled or fulcrumed on a third drive unit 17 by parallel horizontal pins 16, 16. The spacing between and the directions of the parallel pins 13, 13 are substantially the same as those of the pins 16, 16. Thus, the four pins 13, 13 and 16, 16 are disposed substantially parallel, so that the third drive unit 17 is always parallel to the second drive unit 12 i.e., horizontal, even when the former is driven rightwards or leftwards as respects FIG. 2 (i.e. frontwards or backwards as respects FIG. 1).

A hand base 18 having a known hand 19 thereunder is mounted to the third drive unit 17, and a hand drive motor 15 for rotation of the hand 19 around a vertical axis V is mounted to the third drive unit 17. Opening and closing movements of the hand 19 are operated by a known air cylinder means or a motor (not shown).

The operation of the handling apparatus is shown in FIG. 3, which shows a situation where the hand 19 is moved by a horizontal distance A from its rest position, shown by dotted lines, by driving of the links 8, 8 rightwards as respects FIG. 3 by the motor 6 by an angle $\theta$ from the rest (vertical) position. Since the links 8, 8, the first drive unit 5 and the second drive unit 12 form a parallelogram, as shown in FIG. 3, the second drive unit 12 is kept horizontal (i.e. parallel to the first drive unit 5). In this case, since the links 8, 8 are inclined from the vertical, the second unit 12 is lifted by a certain distance, and accordingly, the lower tip of the hand 19 is raised by a certain distance, which is shown as B in FIG. 3. Then the following relation holds:

$$A = L \times \sin \theta \quad (1),$$

and $$B = L \times (1 - \cos \theta) \quad (2),$$

where

A is a driven distance in horizontal direction,

B is a driven distance in vertical direction,

L is length of the links 8, 8 (length between the pins 7 and 10), and $\theta$ is the angle of the links 8, 8 from the vertical.

Therefore, in order to make an accurate horizontal movement of the hand by driving the links 8, 8, the hand 19 must be moved downwards, and such downward movement is made by moving the vertical rod 4 downward by the drive motor 3.

The same is applicable to the angular movement of the second links 14, 14 by the motor 11. When both the first links 8, 8 and the second links 14, 14 are moved angularly to bring the hand to a desired position, by moving the first links through an angle $\theta$ and the second links through an angle $\theta'$, then the overall distance B' of downward movement of the vertical rod 4 should be $$B' = L \times (1 - \cos \theta) + L' \times (1 - \cos \theta') \quad (3),$$

where L' is length of the second links.

The above-mentioned corrective downward movement of the vertical rod 4 is effected by use of known computing means, such as a microprocessor, by simply inputting the driven angles θ and θ', which are, for instance, as pulse numbers to the driving circuits of the motors 6 and 11, respectively.

Of course, by further moving the vertical rod 4 any vertical distance, for instance, large upward or downward movements of the hand 19 are attainable.

The parallel links 14, 14 preferably are U-shaped with a hollow part between two leg parts in order not collide with the motor 15 and also for saving weight.

The above-mentioned handling apparatus can handle and move work in three dimensional space.

The handling apparatus in accordance with the present invention has the following advantages:

(1) The relations of the equations (1), (2) and (3) are very simple and easy for known computing means, for example, a microcomputer, and therefore controlling for accurate horizontal movements of the hand 19 is easy.

(2) Since positional directions of the driving units 12 and 17 are always parallel to that of the first driving unit 5, the axis V of the hand 19 is kept always vertical, and therefore, the handling action is easy and reliable.

(3) Since the parallel links 8, 8 and 14, 14 both are journaled at their upper end and driven to swing at their lower ends, the vertical space required for movements of the apparatus is small. This is convenient and useful for actual manufacturing line, where air hoses, electric wires oil hoses are connected in a space above to the handling apparatus.

What is claimed is:

1. Handling apparatus comprising:
   first and second parallelogram linkage mechanisms having a common link, the pivotal axes of the links of said first mechanism being disposed at right angles to those of said second mechanism and the axes of said common link comprising said first mechanism being in a plane substantially parallel to a plane including the axes of said common link comprising said second mechanism;
   holding means connected to a link of one of said mechanism opposite said common link;
   first power-operated means connected to said first mechanism for angularly moving the connected links thereof relative to each other; and
   second power-operated means independent of said first power-operated means connected to said second mechanism for angularly moving the connected links thereof relative to each other.

2. The apparatus defined in claim 1 wherein the first and second mechanisms are arranged so that the pivotal axes of the links thereof are substantially horizontal with the first mechanism positioned above the second mechanism and including power-operated means connected to said first mechanism and to a base for raising and lowering said mechanisms relative to said base.

3. The apparatus defined in claim 2 including means for operating the raising and lowering power-operated means to maintain the holding means at a substantially constant elevation below the base on operation of the first and/or second power-operated means.

4. The apparatus defined in claim 2 including:
   means mounting the holding means to the link to which it is connected for angular adjustment about a substantially vertical axis; and
   power-operated means connecting to said holding means and to said link for adjusting the angular position of said holding means.

* * * * *